C. A. BUNKER.
MILLING MACHINE.
APPLICATION FILED JULY 23, 1917.

1,292,245.

Patented Jan. 21, 1919.
10 SHEETS—SHEET 1.

Fig.1

INVENTOR
Charles A. Bunker
BY
Richard H. Manning
ATTORNEY

C. A. BUNKER.
MILLING MACHINE.
APPLICATION FILED JULY 23, 1917.

1,292,245.

Patented Jan. 21, 1919.
10 SHEETS—SHEET 2.

Fig. 2.

INVENTOR
Charles A. Bunker
BY
Rich A. Manning
ATTORNEY

C. A. BUNKER.
MILLING MACHINE.
APPLICATION FILED JULY 23, 1917.

1,292,245.

Patented Jan. 21, 1919.
10 SHEETS—SHEET 3.

Fig. 3.

INVENTOR
Charles A. Bunker
BY
Rich H. Manning
ATTORNEY

C. A. BUNKER.
MILLING MACHINE.
APPLICATION FILED JULY 23, 1917.

1,292,245.

Patented Jan. 21, 1919.
10 SHEETS—SHEET 4.

INVENTOR
Charles A. Bunker
BY
Richard Manning
ATTORNEY

C. A. BUNKER.
MILLING MACHINE.
APPLICATION FILED JULY 23, 1917.

1,292,245.

Patented Jan. 21, 1919.
10 SHEETS—SHEET 5.

Fig. 5.

INVENTOR
Charles A. Bunker
BY
Frederick W. Manning
ATTORNEY

Fig. 6.

C. A. BUNKER.
MILLING MACHINE.
APPLICATION FILED JULY 23, 1917.

1,292,245.

Patented Jan. 21, 1919.
10 SHEETS—SHEET 10.

INVENTOR
Charles A. Bunker
BY
Richard K. Manning
ATTORNEY

UNITED STATES PATENT OFFICE.

CHARLES A. BUNKER, OF KANSAS CITY, MISSOURI, ASSIGNOR TO CHARLES C. ALLEN, OF KANSAS CITY, MISSOURI.

MILLING-MACHINE.

1,292,245.　　　　　Specification of Letters Patent.　　Patented Jan. 21, 1919.

Application filed July 23, 1917. Serial No. 182,237.

*To all whom it may concern:*

Be it known that I, CHARLES A. BUNKER, a citizen of the United States of America, residing at Kansas City, in the county of Jackson and State of Missouri, have invented certain new and useful Improvements in Milling-Machines; and I do hereby declare that the following is a full, clear, and exact description of the invention, reference being had to the accompanying drawings, forming a part of this specification.

The invention relates particularly to a machine for forming lap joints for the union of cylindrical bands, key and piston-packing rings, wherein a steam or gas-tight joint for the latter may be formed.

The invention consists in the novel mechanism hereinafter fully described and specifically pointed out in the claims.

In the drawings.

Similar numerals of reference indicate corresponding parts in all the figures of the drawings.

The frame of the machine, as seen in the drawings, to which reference is made, consists of the vertical side plates or standards 20 and 21, on the respective right and left hand sides of the machine, spaced apart and provided with outwardly-extended flanges 20', 21', at their lower ends. A base plate 22 extends between the lower portions of the plates 20 and 21, and is integrally connected at its ends with the respective plates. With the upper ends of the plates 20 and 21 is integrally connected the respective ends of the horizontal top member or plate 23. Upon the rear portions of the side members or plates 20 and 21 are flanges $20^x$, and $21^x$, respectively, which extend inwardly a short distance. The forward portions of the side plates 20 and 21, at a point about one-fourth the distance upwardly from the respective flanges 20' and 21', in the direction of the top plate 23, extend outwardly a short distance, as shown, and in which portions are formed the shaft bearings 24 and 25, respectively (see Fig. 7), from which bearings the said forward portions of the side plates 20 and 21 extend forwardly and downwardly, to the line of the base plate. Upon the forward portions and at the upper ends of the side plates 20 and 21 are the outwardly-extended shaft-supporting blocks or lugs 26 and 27, respectively. Between these lugs and secured to the lower surface and forward portion of the top plate 23 is a perforated, forwardly-extended lug 28. Connected with the rear upper portion of the side plate or standard 21, and extending outwardly at right angles thereto, is a bracket 29, the outer portion 30 of which bracket (see Fig. 4) is bent at right angles and extended forwardly to a position in line with the lugs 26 and 27. In said portion 30, of the bracket 29, is a shaft opening or bearing 30', and in the upper portion of the lug 27 is a shaft opening or bearing 27'.

In the bearing 30' is journaled the outer end of the main driving rotary shaft 31, the inner end of which shaft extends through the bearing 27', in the lug 27, and through the perforated lug 28, and a short distance from the outer surface of said lug, and upon said end is a fixed collar 32.

Upon the outer end of shaft 31, and within the portion 30, of the bracket 29, is loosely mounted the hub 33, of a band wheel 34.

Upon the inner portion of the hub 33 are clutch teeth 35. An annular recess 36$^x$ is formed in the hub concentrically with the portion carrying the teeth 35, of the clutch. The core of the hub 33 is of increased circumference to that of shaft 31, and extending around the said shaft is a sleeve 36, upon which the hub 33 finds its bearing upon the inner end of which hub is a circular flange 37, which enters the recess 36$^x$, of the hub. The outer end of the sleeve extends a slight distance beyond the outer portion of the hub 33, and upon said end is secured by a tap bolt 38, a circular plate 39 (see Fig. 7). With the plate 39 is connected rigidly the upper end portion of an arm 40, the lower portion of the arm extending downwardly and rearwardly, a short distance, for the purpose further described.

Upon the shaft 31, adjacent the outer portion of lug or block 27, is secured or splined a cog-wheel 41. Upon the forward portion of the cog-wheel is a clutch wheel 42, integral with the cog-wheel, upon the outer portion of which wheel are clutch teeth 43, which are adapted to be engaged by the clutch teeth 35, on the hub 33, of the band wheel 34. Upon the shaft 31, intermediate the lugs 27 and 28, is fixed or splined a worm 44.

In the bearings 24 and 25, on the lower, forward portion of the standards 20 and 21, is journaled a rotary cam shaft 45, the ends of which shaft extend a considerable distance outwardly from the lines of the outer surfaces of the standards. Upon shaft 45 is an adjustable collar 25$^x$, secured by the screw 25$^o$ (see Fig. 3).

The power transmission to the rotary cam shaft 45, from the main driving shaft 31, is effected by a vertical, rotary shaft 46 (see Fig. 5), in rear of shaft 31, and adjacent the inner side of the standard or plate 21, the upper end of which shaft is journaled at 47 (see Figs. 1 and 8) in the top plate 23, of the frame of the machine. The lower end of the rotary shaft 46 is journaled in a bearing or lug 47$^x$, on the inner side of standard 21, a considerable distance above the base plate 22. Upon the upper end portion of the vertical rotary shaft 46 is secured, by a tap bolt, a worm wheel 48, which engages the worm 44, on the main rotary shaft 31 (see Figs. 5 and 8). Upon the lower end portion of the said shaft 46 is a worm 49, and upon cam shaft 45, opposite said worm, is a worm wheel 50, which engages with the worm 49 (see Fig. 4), and by means of which power is communicated to regulate the operation of the milling devices, as further described.

Figure 1:
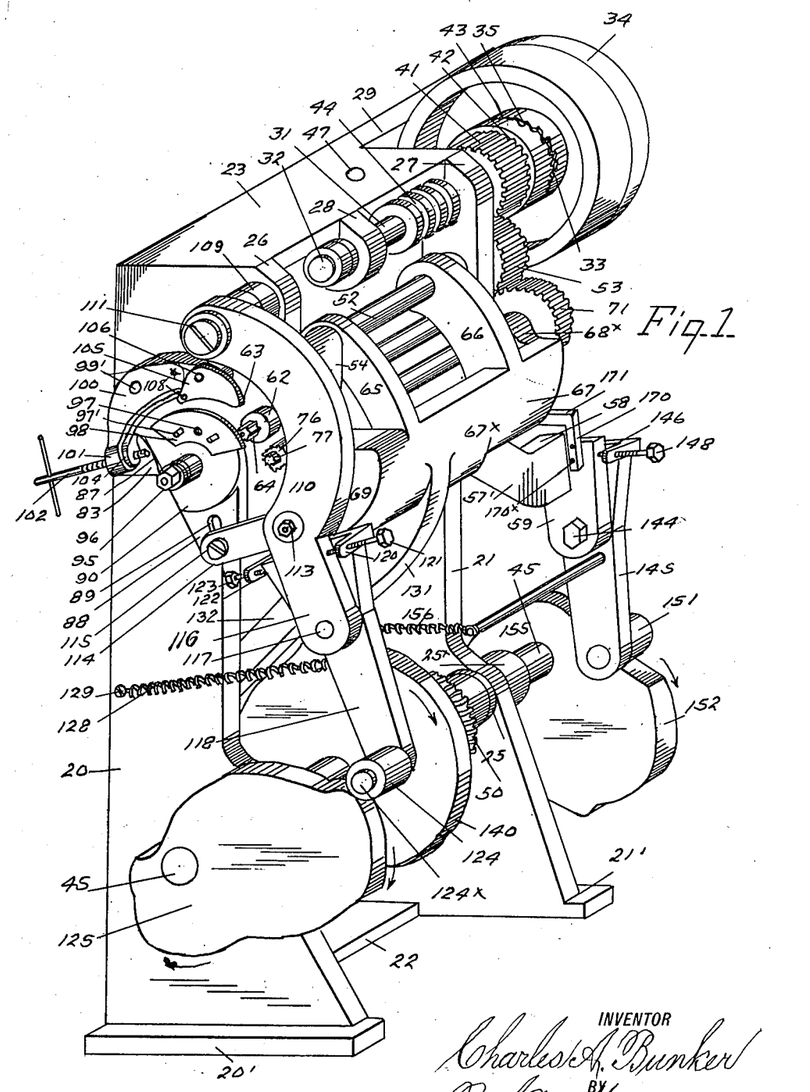
Figure 1. is a view, in perspective, of the joint-forming machine, the position of the operative parts being shown at the beginning of a joint-forming operation.
Figure 3:
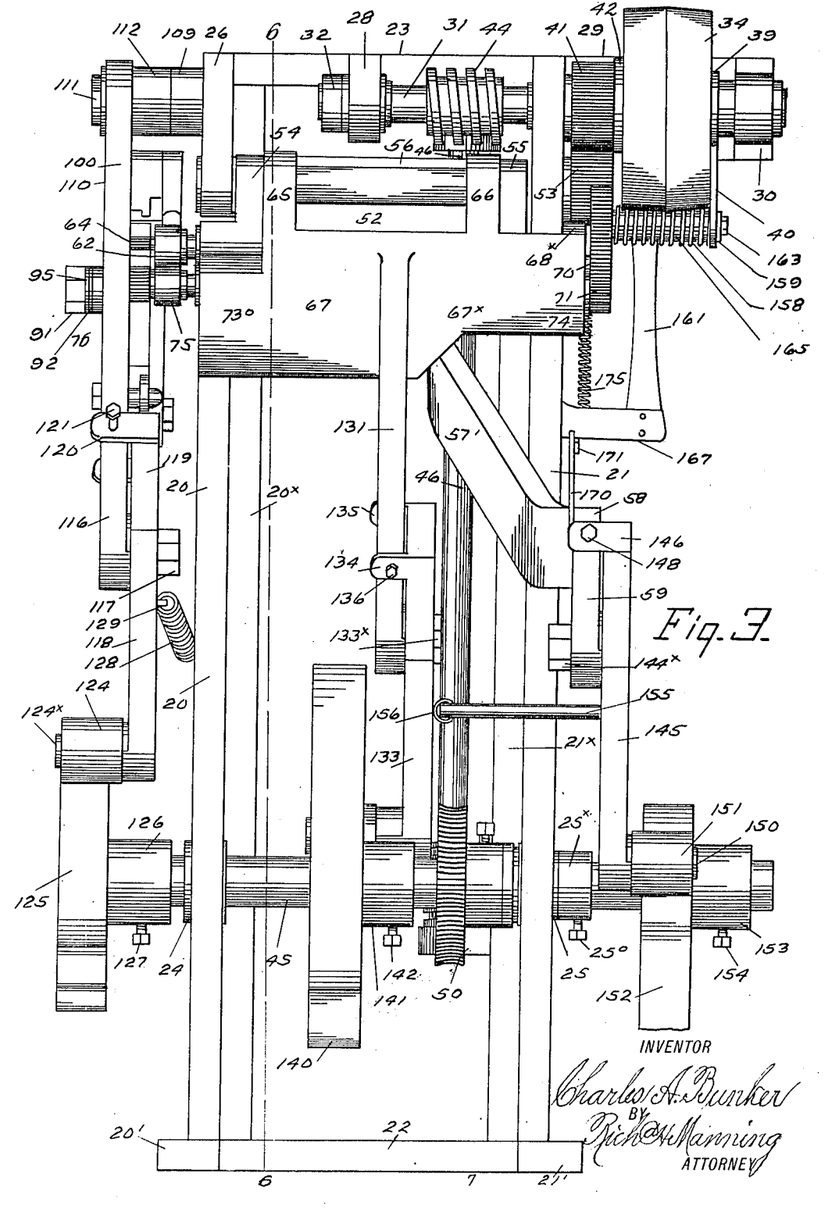
Fig. 3. is a front view, in elevation, of the machine.
Figures 4, 8:
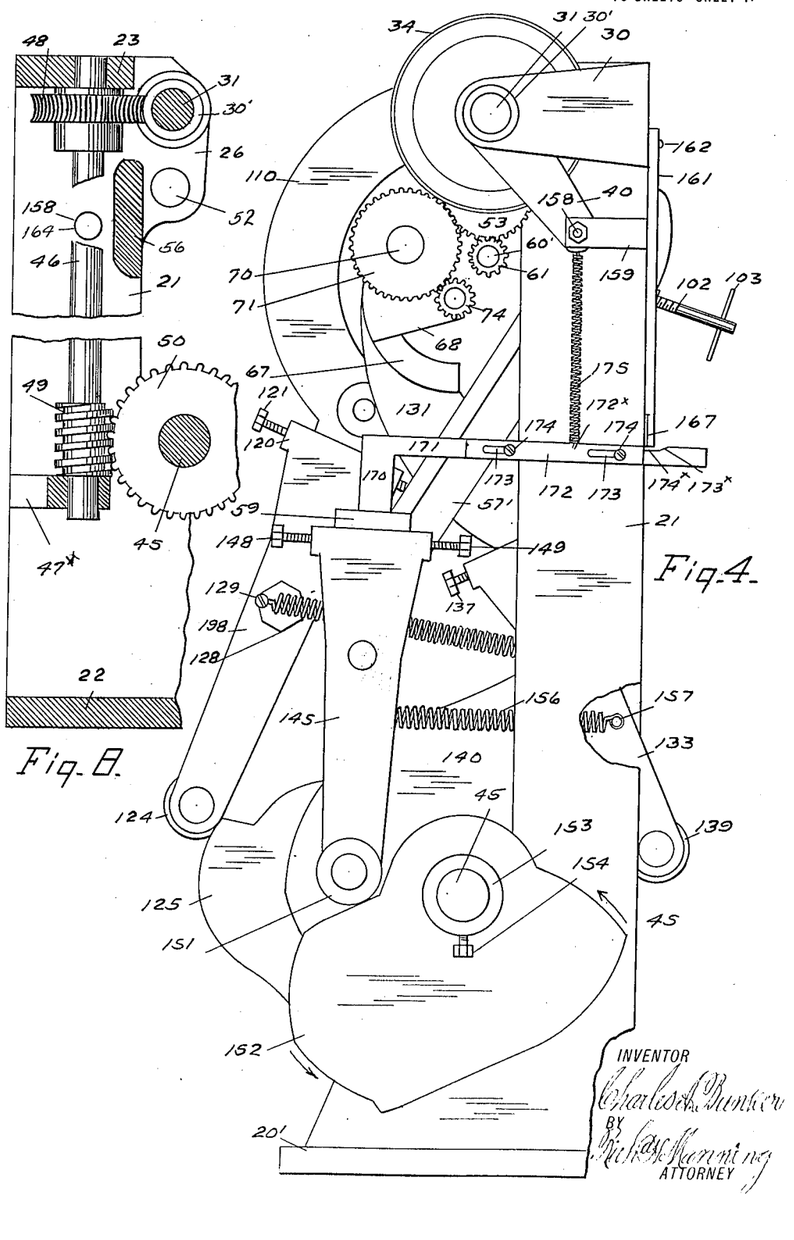
Fig. 4. is a side view, in elevation, taken from the left hand side of the machine.
Fig. 8. is a broken, vertical, sectional view, taken on line 8—8, in Fig. 5.

In the lower portions of the lugs 26 and 27, on the respective forward and upper end portions of the respective standards 20 and 21, is journaled the ends of the stationary shaft 52, one end portion of said shaft being extended a short distance from lug 27, toward the band wheel 33, and upon said end of the shaft is loosely mounted a cogwheel 53, which meshes with the cog wheel 41, on the main shaft 31 (see Figs. 1, 3 and 8).

Upon the shaft 52 is loosely mounted or hinged, adjacent the inner portions of the lugs or blocks 26 and 27, the upper portions of the plates or arms 54 and 55, respectively, the lower portions of which arms or plates extend downwardly to form shaft bearings, further described, and with the rear portions are connected the respective end portions of an outwardly-curved connecting plate 56, which plate extends a short distance forward of the vertical rotary shaft 46 (see Fig. 8). With the rear portion of the plate 56, intermediate its ends, is connected rigidly the upper end portions of a flat operating arm 57, which is as shown transverse to plate 56. The arm 57 extends downwardly a short distance, and a portion 57', bent at an oblique angle to the portion 57, and extended forwardly and downwardly, thence bent at right angles at 58, and extended outwardly and transversely to the standard or plate 21, and secured rigidly to the rear portion and upper end of a vertical bar 59 (see Figs. 3 and 6).

In the lower portion of the pair of arms 54 and 55 are shaft bearings, in which are journaled the respective ends of a rotary tool-carrying shaft 60 (see Figs. 4 and 7), a portion 60' at the end journaled in the arm 55, being reduced in circumference and extended outwardly a short distance, and upon said portion of the shaft is a small cog-wheel 61, which meshes with the cog-wheel 53, on shaft 52.

At the other end of shaft 60, a portion 60ˣ is reduced in circumference and extended outwardly and transversely to the forward portion of the plate or standard 20 to an operative position, formed thereof. Said reduced portion 60ˣ, of shaft 60, is hollowed out and slit longitudinally to form a jaw, and also externally screw threaded, and the outer ends tapered, and upon said slit portion 60ˣ is an internally screw threaded nut 62.

64 is a milling or cutting wheel, small in circumference and having cutting teeth, and provided with a shank, which extends within the split portion of shaft 60, and is held therein by the nut 62, which secures the cutting wheel removably to the said shaft. Upon the shaft 52, supporting the hinged arms 54 and 55, and close in position to the inner sides of said arms, are hinged the upper ends of the separate, pivoted arms 65 and 66, respectively, which arms extend in outwardly-curved lines forwardly and downwardly, below a horizontal line extending through arms 54, 55, and with the lower portions of said arms is connected a horizontally-extended semi-circular plate or casting 67, extending downwardly and inwardly (see Fig. 6), to a position above the outwardly-extended portion 57', of the operating arms 57, on the plate 56, the right hand lower portion of the plate 67 being cut away horizontally, at 67ˣ, to afford clearance for the upward movement of said portion of the arms (see Fig. 1).

One end of the curved plate 67 extends to a position forward of standard 21, and a slight distance to the right of said standard, and upon the end of said plate is an inwardly-extended end plate 68. The other end portion of the curved plate 67 extends to a position immediately forward of the standard 20, and is provided with an end plate 69, extending inwardly a short distance.

In the upper portion of the end plate 68 is an upward projection 68ˣ, in which is an outwardly extended stud shaft 70, upon which is mounted a gear wheel 71, which meshes with the loose cog wheel 53, on stationary shaft 52.

In the inner and upper portion of the end plates 68 and 69 are journaled the respective ends of a tool-carrying rotary shaft 73. A portion of the shaft 73, supported by the end plate 68, extends outwardly from said plate and is reduced in circumference at 73', and upon the outer end of said reduced portion is secured a cog-wheel 74, which meshes with the gear wheel 71, on the stud shaft 70, and moves in an arc of a circle, hence is constantly in gear with said cog-wheel 71. The other portion of shaft 73, which is journaled in the arm 69, is also reduced in circumference and hollowed out and split to form a jaw 73°, and extended a distance corresponding to the split portion or jaw 60ˣ, on shaft 60, on the arms 54 and 55, and upon said reduced split portion 73° is a nut 75. Upon shaft 73 is a cutting wheel 76, having cutting teeth, in the same manner as described of the cutting wheel 64, on the shaft 60, but reversed in direction to cutter 64.

This cutting wheel 76 is larger circumferentially than the cutting wheel 64, and is fixed to a shank 73ˣ, said shank being held by the split portion or jaw 73°, by the nut 75. Upon a stud extending from the axis of the cutting wheel 76 is the cutter 77 which is of the same circumference as the said cutting wheel 64, said cutting wheel 77 being outwardly in position, in respect to the other cutting wheels 64 and 76.

The work-holding devices for holding the rings in position in the path of the cutting wheels, and feeding forward the parts to be milled are located upon the upper portion and adjacent the outer surface of the side member or standard 20. The lower portion of the holder is mounted on the outer end portion of a horizontally and rearwardly adjustable, stationary shaft 78 (see Fig. 13), a horizontal slot 79, being made in the standard 20, at a point a short distance below a line extending horizontally through the shaft 73, carrying the cutting wheels 76 and 77, in which the rear end portion of the stud shaft is held, the inner end of said portion being screw-threaded at 78*, and upon said end is a nut 80, between which nut and the inner surface of the standard 20 are washers 81. In the outer surface of the standard opposite said slot 79, is a horizontal groove 82, in which is a horizontally slidable or adjustable plate 83, having a flange 84. In said adjustable plate 83, registering with the slot 79, is a shaft opening 85, through which the shaft 78 extends.

The outer portion 78', of the shaft 78, is increased slightly in circumference, and upon said end portion is pivotally mounted the semi-circular plate 86, from which extends diametrically and upwardly a narrow plate or arm 87 and downwardly therefrom, a narrow plate or arm 88, in the outer end of which arm is a slot 89.

Upon the plate 86 is an inwardly-extended, circular portion 90 (see Fig. 14), integral with the plate 86, the rear portion of which plate is broken away to form a shoulder 91. Upon the said plate 86, and extending around said portions 78', of shaft 78, is a short hub 92, and between said hub and the face of the adjustable plate 83 is a washer 93. Upon said portion 78', of shaft 78, and extending outwardly from the plate 90, is a hub 94. The outer end of said portion 78', of the shaft 78, is screw threaded, and upon said end is a nut 95, and between said nut and the hub 94 is a washer 96.

Secured to the upper and outer face portion of the plate 90, by means of the screw 97, and pins 97', is a bearing plate 98, for the ring to be milled, which plate is in the form of a segment of a circle, the upper, curved portion of said plate extending a short distance above the curved line of the plate 90, and immediately in rear of said portion of the plate and above said plate 90 is positioned the cutting or milling wheel 64. The upper, curved surface of the plate 98 is beveled outwardly and downwardly (see Fig. 5). To the upper perforated portion of the arm 87 at 90 is pivoted on pivot 99' the upper central portion of the clamp-supporting plate 100, said plate having an inwardly-curved surface concentric with the outer surface of the segmental bearing plate 98.

Upon the rear portion of the clamp-supporting plate 100 is a boss 101, having a screw threaded opening 100$^x$, in which is extended the screw threaded shank of an adjusting screw 102, having handles 103.

In the outer, lower edge portion of the clamp-supporting plate 100 is a rabbet 104. 105 indicates the adjustable clamping or jaw plate, on the outer side and forward portion of the clamp-supporting plate 100, which is pivoted at 106, to said plate. The forward portion of said plate 105 extends forwardly and downwardly in an outwardly-curved line. The lower portion of the plate 105 is curved inwardly, in the arc of a circle, at 107, and said curved portion extends a short distance below the curved line of the rabbeted, lower, curved portion of the supporting plate 100. Upon the inner side and lower portion of the clamping plate 105 is a rabbet 108, curved inwardly in line with the lower, curved surface of said plate, said rabbet 108 and the rabbet 104, in the supporting plate 100, serving to prevent the lateral movement of the ring to be milled.

In the lower portion and inner end of clamping plate or jaw 105 is an adjusting screw 108$^x$, the inner end of which screw extends within the rabbet 108, (see Figs. 1-5-10 and 11) and acts to cant the piston ring at the desired angle to the cutters.

Figure 7:
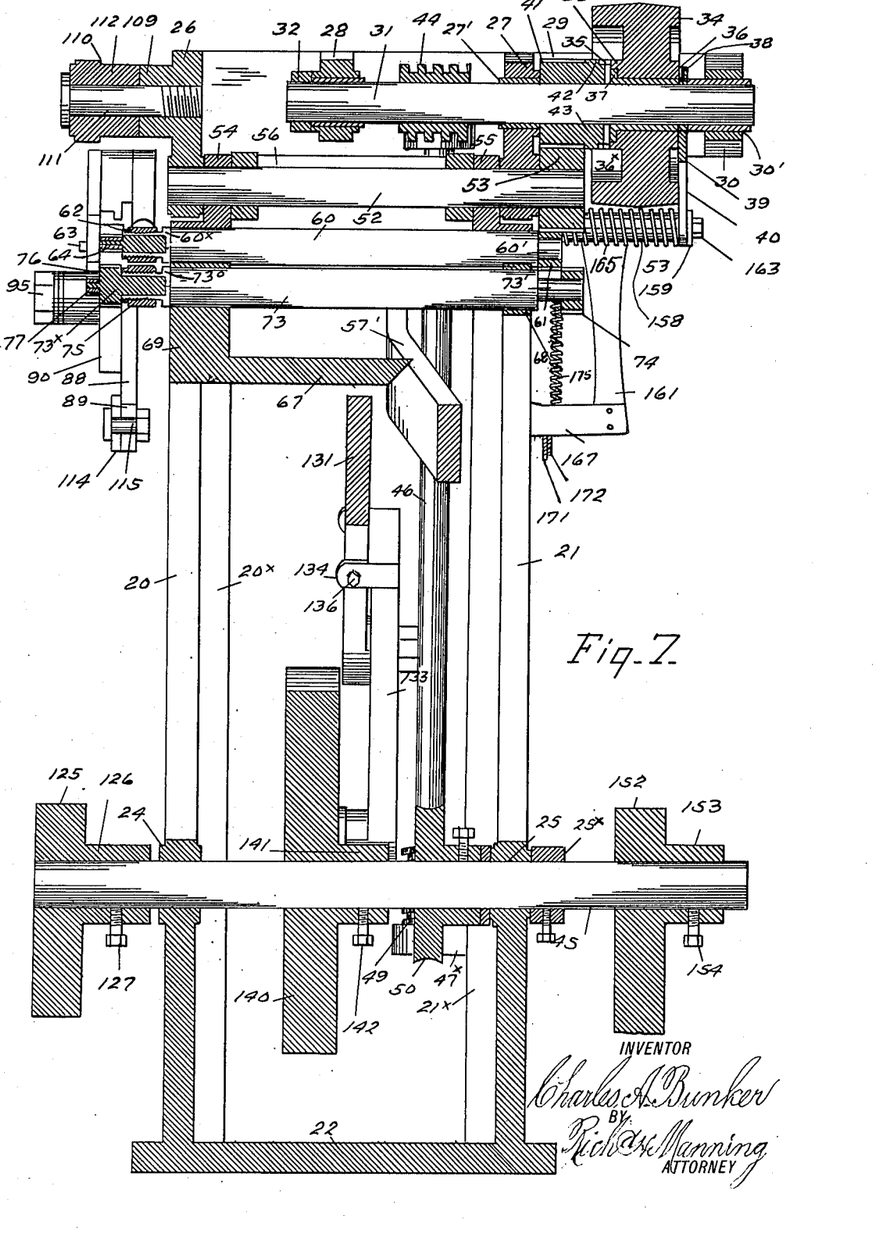
Fig. 7. is a longitudinal, vertical, sectional view, taken on the line 7—7, in Fig. 2.

The feeding devices for feeding the parts of the ring to be milled, consist of an outwardly and forwardly curved arm 110, which is pivoted at its upper end by the lug screw bolt 111, to the outer end portion of an annular lug 109, on the outer side and upper end portion of the block or lug 26, on the forward, upper portion of standard 20 (see Fig. 7). Upon the inner portion of said upper end of arm 110, and integral therewith, is an inward projection or lug 112, which bears against the lug 109, and through which the lug screw bolt extends.

With the inner side and lower curved portion of the arm 110 is pivotally connected by the screw bolt 113, the outer end of a connecting bar 114, the inner end of which bar extends to and upon the outer face portion of the arm 88, on the clamp supporting devices, and is adjustably secured thereto by the screw bolt 115, which bolt extends through the slot 89, in the arm 88.

With the lower, curved portion of the arm 110 is connected integrally the upper end of a short arm 116, which arm extends downwardly in a direct line of the chord of said curved portion, intersecting the end portions of the curved arm 110. The lower end portion of the arm 116 is pivotally connected by means of the pivot bolt 117, with the outer side of an adjustable arm 118, at a point approximately a little less than one-half the distance downwardly from the upper end of said arm 118. The upper end of arm 118 is wider than its lower portion, or V-shaped at 119, and upon one of said V-shaped portions is a forwardly-extended lug 120, in which is an adjusting screw 121, bearing on the forward edge of the said arm 116, and upon the other or inner side of the arm 118 is a lug 122, in which is an adjusting screw 123, which bears on the inner edge of the arm 116.

Upon the lower portion of the arm 118 is an outwardly-extended pin 124$^x$, upon which is an anti-friction roller 124.

Upon the outer end portion of the rotary cam shaft 45, and in the path of the roller 124, in the adjustable arm 118, is an irregular cam plate 125, with which the said roller 124 contacts, at a point above a line extending horizontally through cam shaft 45. Upon the inner side of the cam is a hub 126, extending around the shaft, which hub is secured thereto by a set screw 127 (see Fig. 5).

Figure 9:
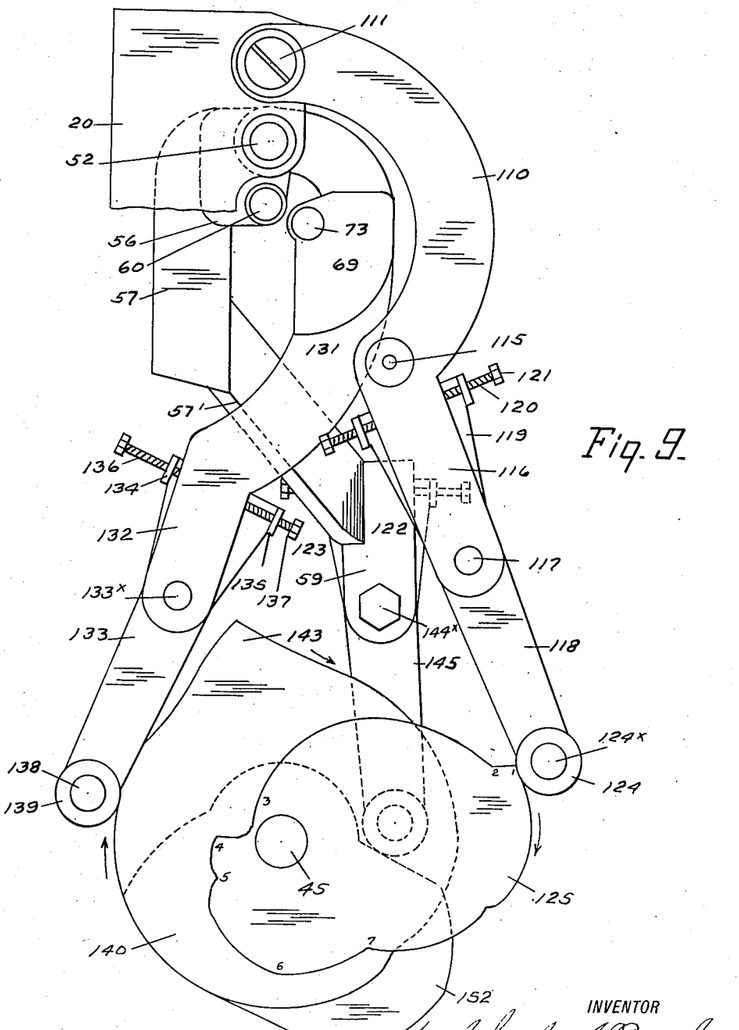
Fig. 9. is a side, diagrammatic view, in detail, of the series of cams and lever arms, in their various operative positions, at the beginning of the varied movements, in succession, of the milling devices in the formation of the joint.

The cam plate 125 is alike to the heart-shaped cam, but differs therefrom in its neutral, as well as actuating parts, the positions of the cams, during the various movements, being shown diagrammatically in Fig. 9.

Figure 5:
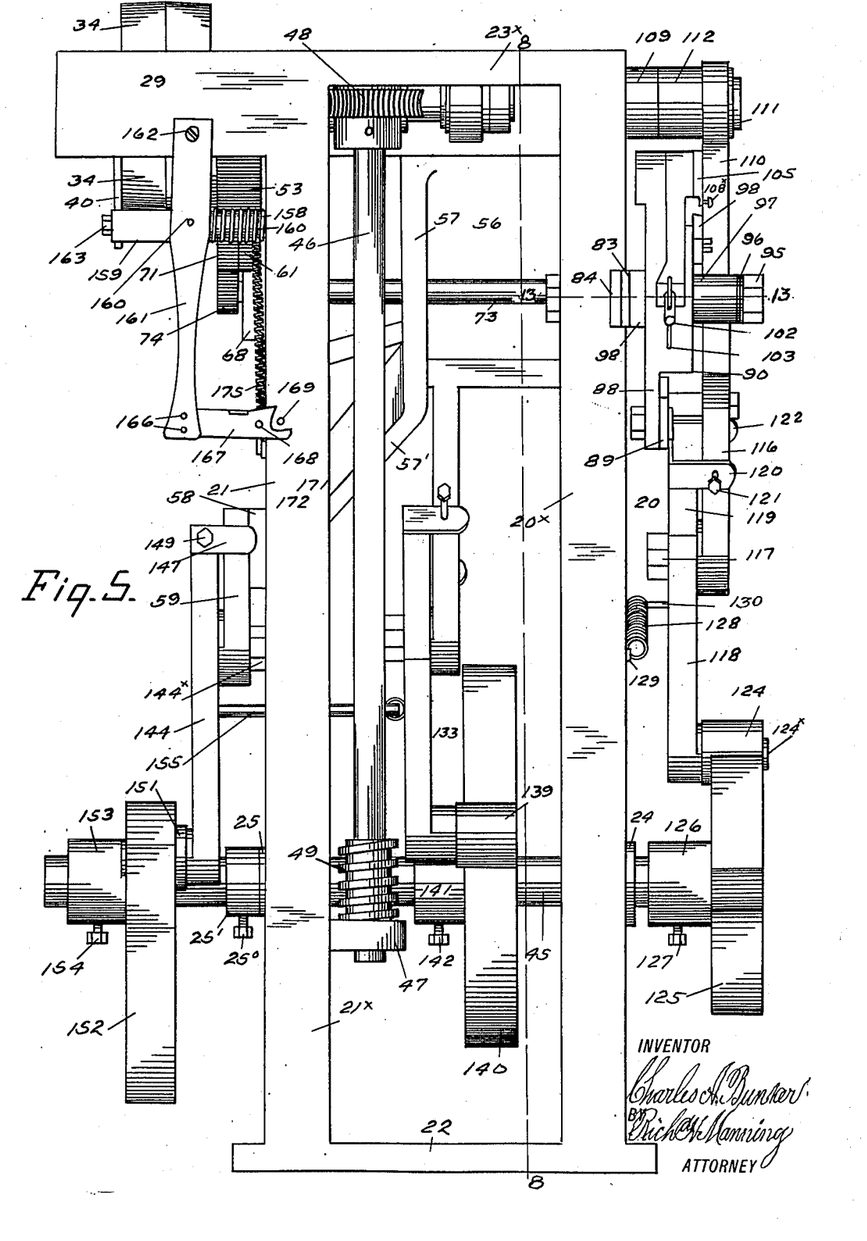
Fig. 5. is a rear view, in elevation, of the machine.

In order to keep the roller 124, on arm 118, in contact with the edge portions of the cam, a spiral spring 128 is secured at one end to a screw 129, on the outer side of the standard 20, and at the other end to a pin 130, on the inner side of the arm 118 (see Figs. 1 and 5). With the outer surface of the plate 67, connected with the hinged arms 65 and 66, on the stationary shaft 52, is connected the upper end of an operating bar or arm 131, which, as shown, is arranged in an edge-wise position, at a point intermediate the ends of said plate 67, and forms an integral part thereof (see Fig. 6). This plate 131 extends downwardly in a forwardly-curved line and rearwardly, and with the lower curved portion is connected a short arm 132, which forms an integral part of the curved portion 131, and extends downwardly and rearwardly therefrom.

The lower end of arm 132 is pivotally connected with an adjustable plate or arm 133, by the pivot bolt 133$^x$, a little less than one-half the distance downwardly from the upper end of arm 133, the upper end portion of said arm being V-shaped in construction and provided with lugs 134 and 135, opposite in position, in which are the adjusting screws 136 and 137, respectively, which bear upon the opposite portions of plate 132, said arms 132 and 133 being similar to the arms 116 and 118, of the feeding devices. Upon the lower end of the arm 133 is a pin 138, upon which pin is an anti-friction roller 139.

Figure 6:
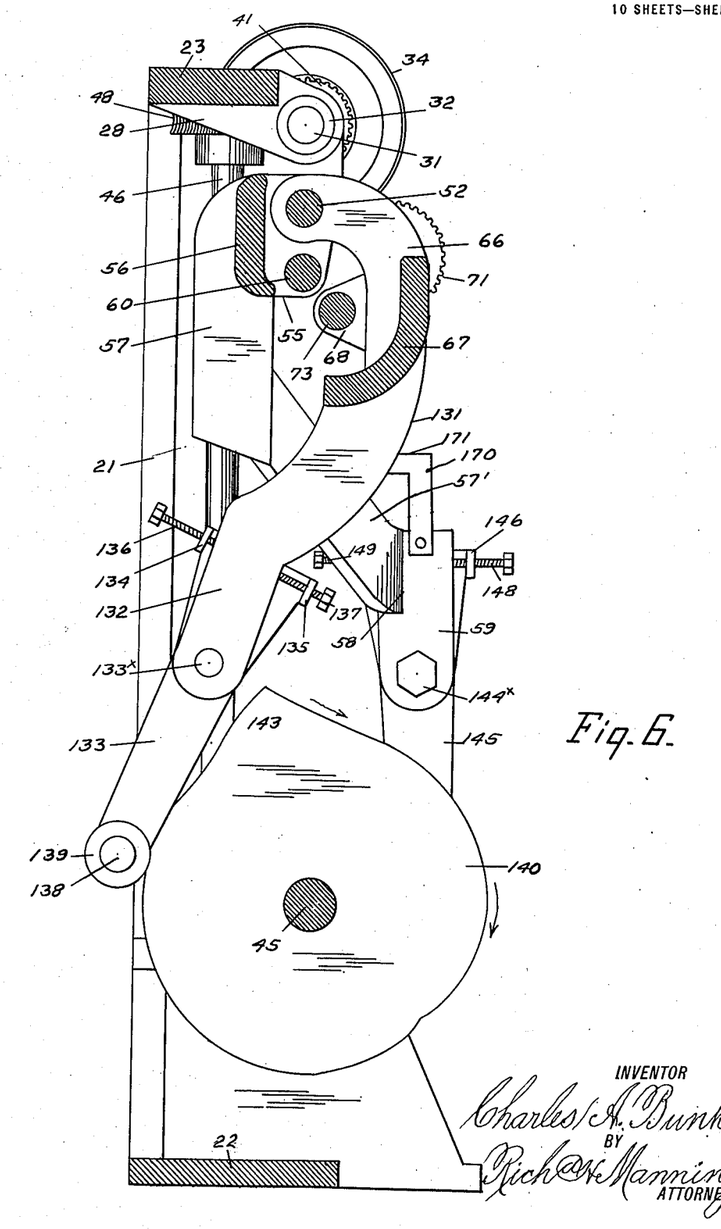
Fig. 6. is a transverse, vertical, sectional view, taken on the line 6—6, in Fig. 3.

Upon the rotary cam shaft 45 is a cam 140, which is in the path of the roller 139. Upon the cam 140 is a hub 141, which extends around said shaft and is secured thereto by a set screw 142. The cam 140, best seen in Fig. 6, is nearly circular in form, with a protuberance 143, the action of the cam being referred to in the operation.

The vertical arm or bar 59 (see Fig. 3) connected with the operating arm 57, on the curved plate 56, before referred to, is pivotally connected at 144$^x$, with an adjustable arm or plate 145, which is the same in construction as the plates 118 and 133, said plate 145 being outwardly inclined at its upper end, and provided with the lugs 146 and 147, opposite in position, in which are the adjusting screws 148 and 149, respectively, which bear upon the edge portions of the bar 59. Upon the lower portion of the adjustable arm 145 is a pin 150, upon which pin is an anti-friction roller 151.

Upon the outer end portion of the shaft 45, in the path of the anti-friction roller 151, is a cam 152, best seen in Fig. 4. This cam is provided with a hub 153, secured to the cam shaft 45 by a set screw 154.

With the inner side of the arm 145 is connected rigidly one end of a long pin 155, the other end of which pin extends transversely to and forward of standerd 21, to a position forward and upon a line extending transversely through the arm 133. Upon the outer end of pin 155 is connected one end of a spiral spring 156, the other end of which spring is connected to a screw or pin 157, on the side of the said adjustable arm 133.

The shape of the irregular cam plate 152, best seen in Fig. 4, is essentially different from the other cams, having more eccentric parts, which will be referred to in the operation.

The mechanism for governing the action of the machine and operating the clutch on the band wheel 34, on shaft 31, and for moving the portion of the clutch on the wheel into engagement with the portion of the clutch on the gear wheel 41, on the shaft 31, and thereby transmitting power to said machine and also for disengaging the clutch automatically at the end of the milling movement, consists of a sliding bolt 158, its outer end being reduced in circumference and screw threaded, and extended through the lower end of the bar 40, before described (see Fig. 3), and upon said end of the bolt outside of the bar 40, is connected the inner end of a connecting bar 159, which bar extends rearwardly a short distance and is bent at right angles and extends in a parallel line with said sliding bolt 158, and connected pivotally at 160, with the forward side portion of a vertical operating bar 161, which bar 161, is connected at its upper end by the pivot 162 (see Fig. 5) to the rear side of the bracket 29, on the standard 21. Upon the screw threaded end of bolt 158 is a nut 163, which secures the plate 159 and the plate 40 to the bolt. The inner end of bolt 158 extends within an opening 164, in the side of standard 21 (see Fig. 8), and extending around said bolt is a spiral spring 165, one end of which spring bears against the outer side of said standard, and the other end of said spring bears against the inner side of the bar 40.

Upon the lower end portion of the pivoted bar 161 is connected rigidly, by the rivets 166, the outer end of a flat spring plate 167, the inner end of which plate extends upon the rear surface of the standard 21 (see Fig. 5). A perforation 168 is made in said inner end of spring plate 167, which springs over and engages with a pin 169, on the said rear surface of standard 21, when the lower portion of the pivoted arm 161 is moved in the direction of said standard to place the opposite portions 33 and 35 of the clutch in engagement with each other.

Figure 10:
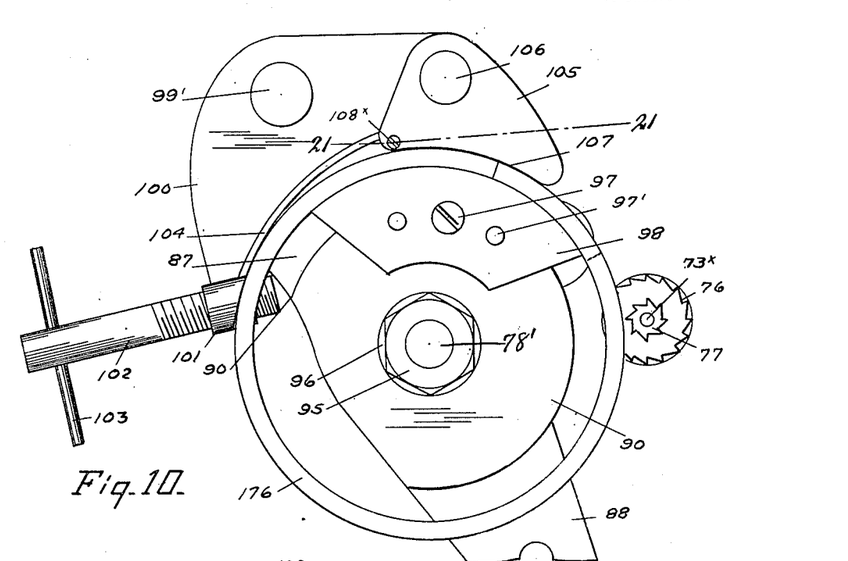
Fig. 10. is an enlarged, front view, in detail of the ring or band-holding clamp, on the stud shaft, and one of the milling tools, the parts being in position prior to an operative movement.
Figure 11:
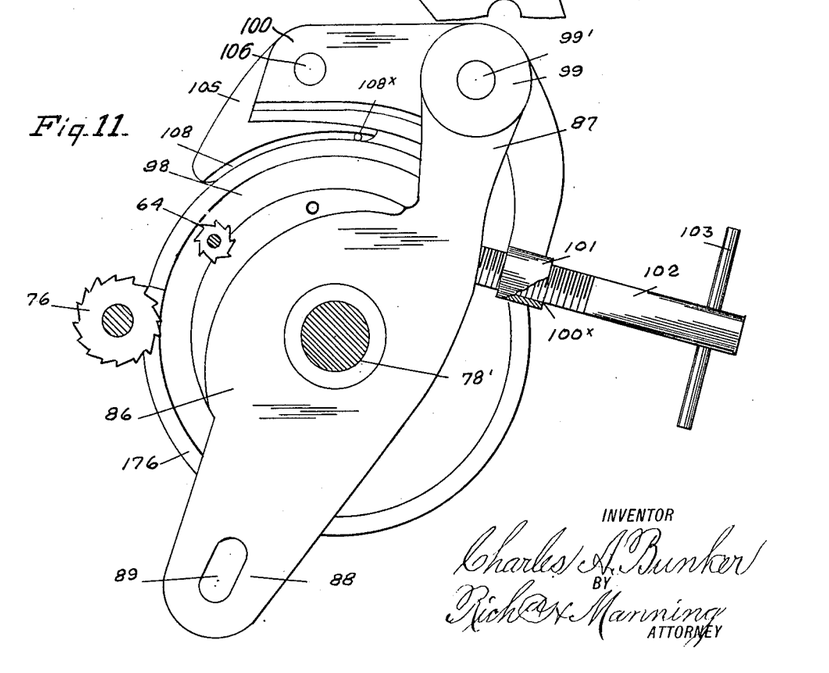
Fig. 11. is a rear view of the parts seen in Fig. 10, also showing both milling tools in relative positions at the beginning of a joint-forming movement.

The automatic release consists of a bar 170, having its lower end pivoted at 170$^x$ to the inner side of the pivoted bar 59, on the adjustable bar 145, which is operated by the cam 152. The bar 170 extends upwardly a short distance, and is bent at right angles and a portion 171 extended adjacent to the outer side of the standard 21. Upon the outer side of the portion 171 of the bar 170 is a straight bar 172 having slots 173, said bar being secured to bar 170 by the screws 174, extending within the slots 173, and by means of which the outer end of the bar 172 may be extended in an adjustment past the end of bar 171. In the outer end of the bar 172 is a notch 173ˣ, and a shoulder 174ˣ, which shoulder is adapted to engage with the inner side and lower edge portion of the spring plate 167. With the said bar 172 is connected, at 172ˣ, the lower end of a spiral spring 175, the upper end of which spring is looped around the sliding bolt 158, and secured upon itself, the action of the spring tending to keep the shoulder 174ˣ on the bar 172 in contact with the forward side and lower edge of the spring plate 167. The ring 176, as seen in Figs. 10 and 11, which are within the clamping devices on the machine, are shown with their outer, opposing ends 177 and 178, in Fig. 15, in readiness to be milled, one part 178 being first milled, and the ring taken from the machine and reversed in position, and the part 177 milled.

The rings in the milling of which the machine is particularly adapted, are cut spirally, hence the milling of the overlapping ends of the rings require their presentation to the milling cutters, in a manner further described.

In operation the clamping screw 102, which operates the pivoted clamping supporting plate 100, being turned to the left, the portion of the plate supporting said screw is depressed, and the pivoted clamping plate 105 is raised, in open position above the plate 98.

Figures 12, 13, 14, 15, 16, 17, 18, 19, 20, 21:
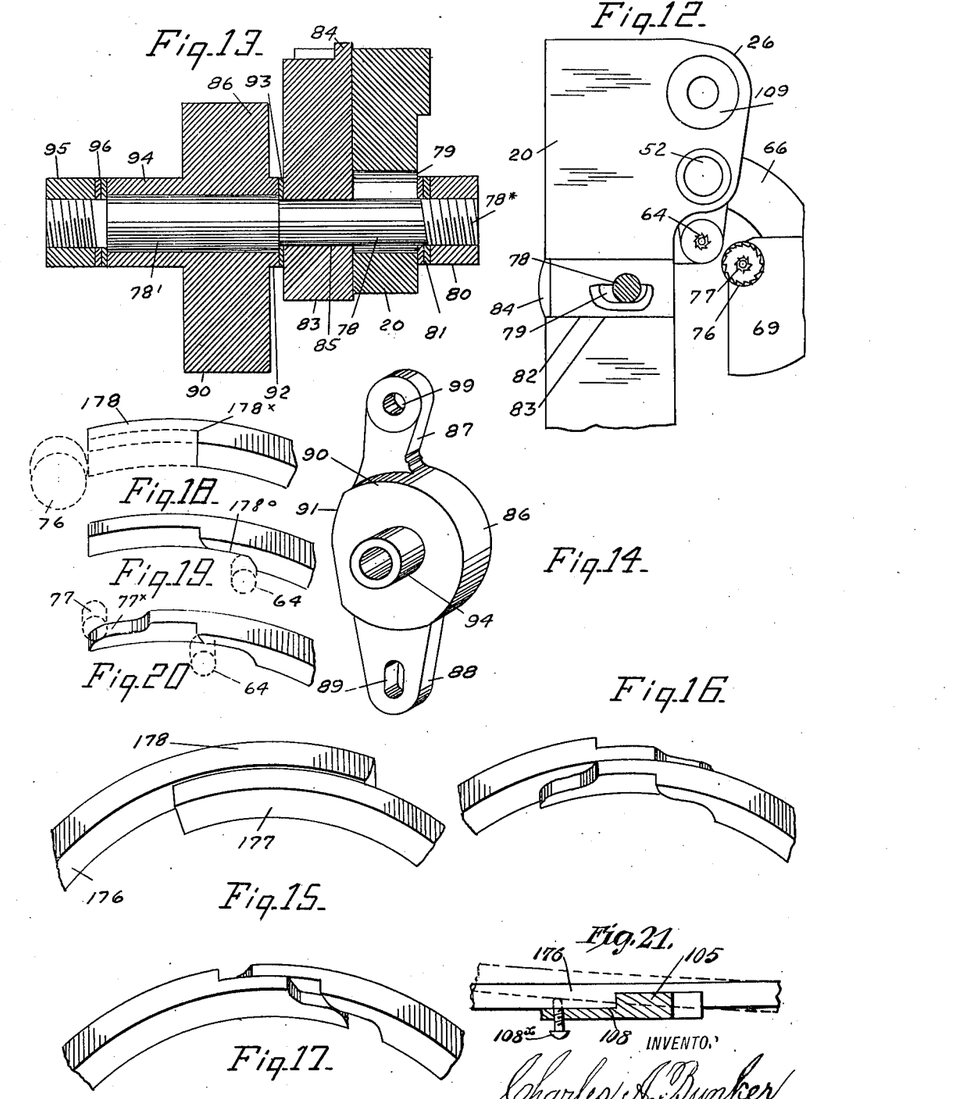
Fig. 12. is a detail view of the upper portion of the standard on the right hand side of the machine, with the clamping devices removed, showing the adjustable slide support for the stud shaft, also showing the milling devices on the shafts on the pivoted arms.
Fig. 13. is a horizontal, transverse, sectional view, taken on the line 13—13, in Fig. 5, showing the elongated opening in the standard.
Fig. 14. is a detail view, in perspective, of the ring support and arms, taken from the inner side of said plate.
Fig. 15. is a detail view of a portion of the ring, before the joint milling operation.
Fig. 16. is a view of a portion of the ring, showing the joint formed by the machine upon the overlapped ends.
Fig. 17. is a view of the lapped portions of the ring, moved past each other into engaging positions.
Figs. 18, 19 and 20 are detail views of the end portions of the ring, showing the progressive steps in milling the ring.
Fig. 21. is a horizontal sectional view taken through the adjustable ring clamping plate on line 21—21 on Fig. 10, showing the adjusting means for adjusting the position of the ring laterally at an angle to the cutters.

The end portion of the piston ring indicated in Fig. 15 by the numerals 178, is then inserted within the rabbet 104, in the clamp-supporting plate 100, and with the inner surface of the said portion of the ring resting upon the upper outwardly and downwardly-inclined curved surface of the supporting plate 98, seen in Fig. 5, which inclines the said portion of the ring downwardly and outwardly in a slight degree, the lower portion of the ring being directed inwardly, toward the feeding arm 88. The end portion of the piston ring to be milled extends slightly beyond the forward end of the bearing plate 98, at a point seen in dotted lines in Fig. 10. In this position of the said end of the ring, the screw 102 is operated to force down the clamping plate 105, upon the upper portion of the piston ring, the outer portion of plate 100 having rabbet 108 extending below the outer side portion 178, of the ring, and by means of the adjusting screw 108ˣ, in the rabbet at the rear end of the plate, the said portion of the ring to be milled is given a slight lateral change in position inwardly and angularly to the cutter.

The arm 161, controlling the sliding bolt 158, is then moved inwardly, and the opening 168 caused to engage with the pin 169, on the standard 21, in which movement of the arm the band wheel 34 moves inwardly, on shaft 31, and the portion 33, of the clutch thereon engages with the portion 35, on the gear wheel 41.

Figure 2:
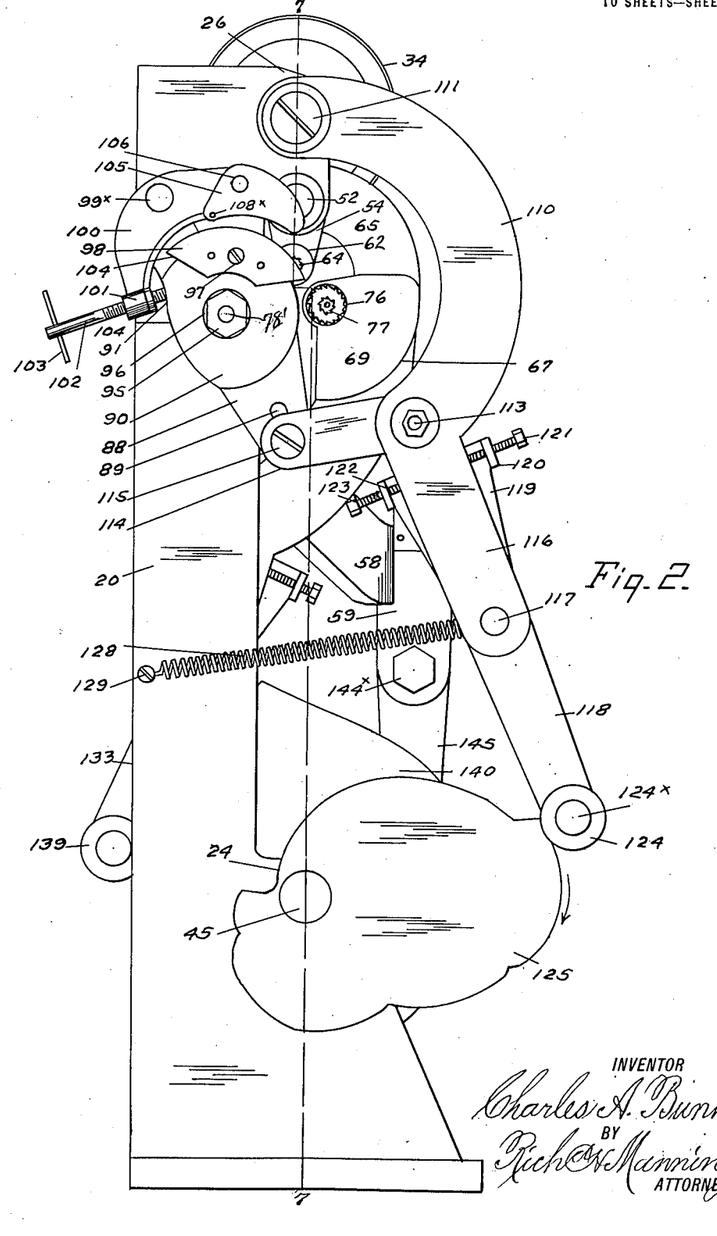
Fig. 2. is a side view, in elevation, taken on the right-hand side of the machine.

The starting position of the irregular feed cam 125 is as seen in Figs. 1 and 2 and 9, and other figures, immediately forward of the recess, seen in Fig. 9 at the greatest distance from the cam shaft 45, and upon which the roller 124 on the arm 118 bears, hence this arm is at its limit of outward movement, and in readiness to communicate a feeding movement to the arm 88, on the stationary shaft 78, which carries the ring-clamping parts 105 and 98. The tendency of this arm to move inwardly is enforced by the spring 128. The position of the arm 145, carrying the roller 151, actuated by the irregular cam 152, seen in Fig. 4, in an inverted position, the roller bearing upon the portion of the cam shaft at a tangent to the cam shaft 45, the spring 175 holding the clutch-releasing bar in position. The irregular cams 125, 140 and 152, being fixed to the shaft 45, their functions, selectively, in the order of movement is referred to first in respect to the operation of the respective cutters upon the portion of the ring to be milled, as seen in Figs. 18, 19 and 20, and the cam movement as seen diagrammatically in Fig. 9.

Power being applied to the band wheel 34, the movement of said wheel in respect to the machine, as seen in Fig. 1, is forward, and the irregular cams 125, 240, 152, turn in the same direction, the movement being from the worm 44 through the shaft 46, and from the worm 49, on said shaft to the worm wheel on cam shaft 45.

From the starting position of the roller 124, on the arm 118, upon the irregular cam 125, the roller 124 makes a quick movement inwardly in the recess indicated by the numerals 1 and 2, in Fig. 9, in which movement the arm 88 is actuated to move the clamping devices carrying the ring, and the end portion of said ring from its dotted position, seen in Fig. 10, into contact with the teeth of the rotary cutter 76. The cutter is then in the position seen in Fig. 18. The roller 124 then moves over the edge of the cam 125, until it reaches the point indicated by the numeral 3, in Fig. 9. In this movement of the roller 124, only the arm 118, which accomplishes the feeding movement of the ring, is in movement, the power from the main shaft 31, however, being transmitted through the cog wheels 41, 53 and 71 and 74, to the rotary shafts 60 and 73, carrying the respective cutters 64 and 76, 77.

During the aforesaid movement of the roller 124, from the point 2, to the point 3 (see Fig. 9), the cutter 76 cuts away the inner half of the end portion of the ring, to a point 178ˣ, indicated in Fig. 18.

From the position of the roller in its movement from the point 3, to the point 4, indicated in Fig. 9, the roller 124, on the arm 118, moves outwardly, which movement reverses the movement of the ring, the movement stopping at the point 4.

During the movement of the roller 124, from the point 4 to point 5, the ring 176 is held stationary, and during said time the arms 132 and 145, which actuate the pivoted arms 69 and 57, in which movement the cutter 64 moves outwardly, and the cutter 77 moves inwardly from the center of the ring being milled. In this movement the rollers 139 and 151 are moving outwardly upon the respective cams 140 and 152.

Upon the completion of the respective outward and inward movements of the cutters 64 and 77, the arms 122 and 131 come to a rest, and motion is imparted to the arm 116, from the movement of cam 125, from the point 5, in which movement the work holder continues to feed the ring in a reverse direction. During the movement of roller 124 from the numeral 5 to 6 on the cam 125, the cutters 64 and 77, while rotating are held in a stationary position, the cutter 64, during this movement cuts out half of the lower part of the ring upon the radius of the curve of the ring, and the cutter 77 cuts upon the same radius upon the upper and forward portion of the end of the ring to the point 77$^x$, in Fig. 20. From the point 6, on the cam 125, to the point 7, the arm 116, controlling the feeding devices, slacks up, and the arms 132 and 133, controlled by the cam 140 imparting an outward movement to the cutters 76 and 77, which are so timed that the cutter 64 moves on the radius 178°, as seen in Fig. 20, and the cutter 77 moves on the radius line 77$^x$, completing the cutting of the ring upon the radius line mentioned. During the movement of roller 124 on cam 125, from the points 7 to 1, the ring continues its reverse movement to the starting position, during which movement the cutter 77 returns to its starting position, and cutter 64 makes a very light finishing cut on the parts originally removed by the cutter 76.

As soon as the roller 124 reaches the starting point on cam 125, the roller 151 on arm 145 has reached its lowest point on cam 152, at which time the arm 172, which has moved inwardly, forces the shoulder 174$^x$ against the spring plate 167, releasing the spring plate from the pin 169, the spring 165, on the sliding bolt 158, exerts an outward pressure on the levers 40 and 161, drawing the band wheel on the rotary shaft 31 outwardly, and disengaging the clutch teeth 35 on the band wheel from the clutch teeth 35, on the gear 41, and the operative parts of the machine cease their movement.

The clamping plate 105 is then released, the ring taken from the jaws and the reverse end of the ring placed in position and clamped in position, as before described, and the milling operation repeated.

Such modifications of the invention may be employed as are within the scope of the appended claims.

Having fully described my invention, what I now claim as new and desire to secure by Letters Patent is:

1. In a milling machine for piston packing rings, the combination with separate movable, rotary shafts, and with cutters on said shafts, and with means for actuating said shafts in an oscillating movement toward the piston ring, of a holder acting to hold said piston ring and movable in a feeding movement toward the cutters, and means automatically acting to reverse the feeding movement of the piston ring holder and recut the work with the same cutters, and upon a different radius from the center of oscillation of said cutter shafts.

2. In a milling machine, the combination with a stationary shaft, of shaft supporting arms in pairs, one pair extending downwardly and the other pair outwardly and forwardly from said shaft, shaft bearings carried by said arms, the bearings upon the outwardly-extended arms extending outwardly from said shaft in one direction, being positioned below a line extending horizontally through the bearings upon the arms extending in the downward direction, rotary shafts in said bearings, and cutters upon the respective shafts, and means for communicating motion to said shafts, and means for communicating an intermittent outward and inward movement to the respective arms.

3. The combination with a supporting shaft, and arms in pairs, each pair extending forwardly and rearwardly in respect to each other, and with bars connected with the respective pairs of arms, and operative arms connected with said bars and extending forwardly and rearwardly, respectively, past each other, means for operating said arms, and cutters upon said rotary shafts.

4. In a mechanism for milling machines, the combination with a supporting shaft, of arms hinged to said shaft in pairs, connecting plates connecting one arm in each pair with the other, and operating arms upon said connecting plates, shaft bearings upon each arm, and rotary shafts in said bearings, milling devices on said shafts, gearing on said rotary shafts, and cams with which the said operating arms are adapted to come into contact.

5. In a mechanism for milling machines, the combination with a main driving shaft and a gear wheel thereon, of a stationary shaft, arms hinged to said stationary shaft in pairs, one of said pairs of arms being outwardly curved and extended in a downward direction, shaft bearings on said arms, and rotary shafts in said bearings, upon each pair of arms, milling devices on said shafts upon one end thereof, and gear wheels on said shafts at the other end, a stud shaft on one of said arms, and a gear wheel thereon meshing with the gear wheel on one of said shafts on one of said pair of arms, and loose gear wheel loosely mounted upon said stationary shaft, meshing with the gear wheel on the stud shaft and with the other gear wheel on the rotary shaft upon the other pair of arms on said stationary shaft.

6. In a milling machine, the combination with a main rotary power shaft, of a parallel stationary shaft, a gear wheel on the former shaft, and a loose gear wheel on the latter shaft in mesh with each other, arms hinged to the stationary shaft in pairs, the arms in one pair being extended outwardly and downwardly in the arc of a circle, transverse connecting plates connecting the arms in each pair with each other, the connecting plates to the curved pair of arms extending downwardly below the horizontal line of the connecting plate of the other pair of arms, and provided with inwardly-extended portions and shaft bearings therein, and shaft bearings carried by the other pair of arms, rotary shafts in the shaft bearings of each pair of arms, and milling devices thereon, and gear wheels on said shafts, one of which on the rotary shaft on one pair of arms engages directly with the loose gear wheel on the stationary shaft, a stud shaft on the inwardly extended portion of one of said connecting plates to the curved arms, and a gear wheel thereon meshing with the loose gear wheel on the stationary shaft and also meshing with the other gear wheel on the rotary shaft on the other pair of arms.

7. In a milling machine, the combination with the main power-driven shaft, and a stationary shaft, of arms movably connected with said latter shaft, and rotary milling shafts supported by said arms, and milling devices on said shafts, means for transmitting power from the main driving shaft to the said milling shafts, and a pivoted rotary work holder in proximity to said milling devices, and means for transmitting rotary motion from the main driving shaft to the said rotary work holder.

8. In a milling machine, the combination with the main driving shaft, and a stationary shaft, of arms movably connected with said latter shaft, and rotary milling shafts supported by said arms, means for transmitting rotary motion from said main power shaft to said milling rotary shafts, milling devices on said milling shafts, a pivoted rotary work holder, and feeding devices for the rotary work holder, and means for transmitting rotary motion from the main driving shaft to the work feeding devices.

9. In a milling machine for piston rings, the combination with the frame of the machine, of a rotating circular ring-supporting plate, of a pivoted ring clamping jaw supported by said plate, and adjusting means for adjusting the position of said ring supporting plate on said frame.

10. In a milling machine for piston rings, the combination with the frame of the machine, of a pivoted plate on said frame, arms on said plate extending in opposite directions from said plate, an annular ring-supporting plate upon the outer face portion of said plate, a clamp-supporting plate pivoted to one of said arms, and a segmental ring clamping plate pivoted centrally to the outer end portion of the clamp-supporting plate, and an adjusting screw at the other end of said plate, bearing upon the edge of the annular projection on the clamp supporting plate.

11. In a milling machine, the combination with the frame of the machine, of an adjustable plate upon said frame and a stationary shaft carried by said adjustable plate, a rotary holder for the work upon said shaft, and means for imparting motion to the rotary work holder.

12. In a milling machine for piston rings, the combination with the frame of the machine, of an adjustable shaft-supporting plate, and a stationary shaft carried by said plate, a rotary plate upon said shaft, having an arm and a ring supporting segmental plate fixed to the outer face of the said rotary plate having an outwardly and downwardly-inclined surface, a ring clamping device carried by the arm on the rotary plate adapted to bear upon the said inclined surface of said segmental plate, and means for operating said rotary plate.

13. In a milling machine for piston rings, the combination with the frame of the machine and with the rotary cutters of a pivoted rotary ring supporting plate, and means thereon for positioning the ring laterally at an angle to the cutters.

14. In a milling machine for piston rings, the combination with the frame of the machine and the rotary cutters of a pivoted rotary plate, and an arm carried by said plate, a segmental ring supporting plate carried by the pivoted rotary plate having an outwardly and downwardly-inclined surface, a clamping plate carried by the arm on said rotary plate having a rabbet, and inclining means upon the inner surface of the rabbet for inclining the ring laterally at an angle to cutters.

15. In a milling machine, the combination with the frame of the machine, of a pivoted rotary work holder, an arm carried by said work holder, a separate work feeding lever arm having a curved upper end pivotally connected with the frame of the machine above the work holder, and a connecting arm pivotally connected with the lower portion of the upper curved end of the lever arm, and adjustably connected with the arm on the work holder and a cam in the path of and adapted to impart motion to the said connecting arm.

16. In a milling machine, the combination with a main rotary power shaft, a stationary shaft, and independent laterally-movable arms hinged to said shaft, connecting plates connected at their ends with the ends of the respective pairs of arms, shaft bearings on said arms, rotary milling shafts in said bearings, and milling devices on said shafts, shaft-operating arms connected rigidly with the connecting plates, a rotary cam shaft and cams thereon in the path of the shaft-operating arms, and means for transmitting power from the main power shaft to the cam shaft.

17. In a milling machine, the combination with a rotary power shaft, and a gear wheel on said shaft, of an independent stationary shaft, and a gear wheel loosely mounted thereon and in mesh with the gear wheel on the main power shaft, independent laterally-movable arms in pairs hinged to the stationary shaft, one pair of said arms being outwardly curved, and connecting plates connected with the respective pairs of arms, the connecting plate on the curved arms being located below the horizontal plane of the connecting plates on the other arms and provided with inwardly-extended portions, shaft bearings thereon, and shaft bearings upon the other pairs of arms, rotary milling shafts in said shaft bearings, and milling devices thereon, gear wheels on said shafts, one of which engages with the loose gear wheel on the stationary shaft, and a stud shaft on the inwardly-extended plate on the curved arms, and a gear wheel loosely mounted thereon in mesh with the gear wheel on the stationary shaft and a gear on the other cutter shaft, and operating lever arms connected with the connecting plates on the respective pairs of arms, and extending, respectively, forwardly and rearwardly, a rotary cam shaft and cams on said shaft in the path of the said lever arms, and a vertical power-transmission shaft, and a worm wheel at its upper end, and a worm upon the main power shaft with which said wheel engages, and a worm upon the lower end of said vertical shaft and a worm wheel on the cam shaft engaging therewith.

18. In a milling machine, the combination with the rotary driving shaft, and a band wheel loosely mounted on said shaft, a clutch having one portion on the band wheel and the other portion rigidly connected with said shaft, laterally movable milling shafts, and means for transmitting motion from the main rotary shaft to the milling shaft, lever arms actuating the movable milling shafts, and a rotary cam shaft thereon, in the path of movement of said lever arms, and mechanism actuated by one of said arms at the completion of a milling movement for moving said band wheel upon said rotary shaft and disengaging the clutch.

19. In a milling machine, the combination with the frame of the machine, of a rotatable power shaft, a band wheel loosely mounted on said shaft, an arm for moving said band wheel slidingly on said shaft, clutch teeth on said band wheel, and a clutch member fixed to said shaft with which the clutch teeth on said band wheel are adapted to engage, a sliding bolt on said frame of the machine, with which the arm on said band wheel is connected, and a spiral spring on said bolt, one end of which spring bears against the frame of said machine, and the other end against the arm on said band wheel, a lever pivoted at its upper end to the frame of the machine, and a connecting plate connected with said arm on the band wheel and said pivoted lever, and a catch plate on said pivoted lever, and a pin upon said frame with which said catch plate is adapted to engage.

20. In a milling machine, the combination with the frame of the machine of a main rotary shaft and a band wheel loosely mounted on said shaft, and a clutch member fixed to said shaft, and with the clutching devices on the band wheel engaging with the clutch member, milling shafts and oscillating supports on said frame therefor, lever arms actuating the said oscillating shaft supports, and cams actuating the lever arms, clutch-operating devices for moving the members of the clutch into engagement, and mechanism on one of the lever arms for actuating automatically the disengagement of the members of said clutch.

CHARLES A. BUNKER.

Witnesses:
M. H. O'DONNELL,
ANNIE L. GREER.